3,230,035
MANUFACTURE OF FINELY DIVIDED COPPER HYDROXYCHLORIDE
Ernst Podschus, Leverkusen, and Werner Joseph, Cologne-Mulheim, Germany, assignors to Farbenfabriken Bayer Aktiengesellschaft, Leverkusen, Germany, a corporation of Germany
No Drawing. Filed Dec. 19, 1961, Ser. No. 160,647
Claims priority, application Germany, Jan. 4, 1961,
F 32,896
4 Claims. (Cl. 23—14)

Finely divided copper hydroxychloride suitable for use as a fungicide is generally prepared from cuprous chloride dissolved in saturated sodium chloride solution using air as oxidizing agent. The copper hydroxychloride is filtered and washed and reslurried with a small quantity of water containing suitable dispersing agents, and then dried in a spray drier. It has also been proposed to dehydrate coarse copper hydroxychloride, which is in itself not suitable as fungicide, by heating it for 2 hours at 250 to 350° C. and then reconverting to $Cu_2(OH)_3Cl$ by means of a suitable quantity of water. The resulting copper hydroxychloride will then be in a suitable colloidal form.

The subject of the invention is a process for the manufacture of finely dispersed copper hydroxychloride, suitable for use as plant protecting agent, by heating coarse copper hydroxychloride to remove water of hydration, and subsequently rehydrating. The process comprises disintegrating an aqueous copper hydroxychloride paste in a stream of hot gas of such turbulence that the particles are heated within a period of less than one second, e.g., about 0.1 sec. to 250 to 500° C. (preferably 300 to 400° C.) whereby they are dried and the water of hydration is partly but not completely, removed, removing the calcined product in the usual manner from the stream of hot gas and then rehydrating it by addition of the required quantity of water. An apparatus described in U.S. Patent No. 2,935,840 has been found to be particularly suitable for producing the required turbulence in the stream of hot gas. The hot gas produced by burning gas or oil is introduced with a slight spin or rotation and at a speed of at least 15 metres per second, preferably 50 to 150 metres per second into the narrow end of a heating chamber which is rotation symmetrical and is preferably conical. The copper hydroxychloride paste is dispersed in the resulting backflow in the axial direction and near the axis of rotation. The two components leave the heating chamber at the wide end, and the dried and calcined copper hydrochloride is separated in the usual manner, for example in a cyclone, and removed from the hot gas. The temperature at which the hot gas flows into the heating chamber is between about 300 and 1000° C., and the temperature at which the gas leaves is maintained at 250 to 500° C., preferably 300 to 400° C.

The process must not be confused with the usual spray drying in which hot gases, together with the sprayed material to be dried, travel through the drier in the same direction of flow, using much longer durations of dwell and avoiding turbulence. The efficiency of the usual spray driers, calculated on the volume of drying space, is only 1/100 to 1/1000 of that obtained with the method of heating in a turbulent stream of hot gas.

If one attempts to dry carefully at suitably low outlet temperatures of 100 to 200° C. to prevent splitting off of water of hydration there is a progressive incrustation of the atomizing chamber and the separating cyclone in the apparatus used in accordance with the invention. On the other hand, heating in the turbulent stream of hot gas is found to be particularly suitable for the process of drying and simultaneous partial dehydration in the said temperature region of 250 to 500° C., preferably 300 to 400° C. It is a remarkable fact that under these conditions copper hydroxychloride may be passed through without leaving a residue and may be separated satisfactorily in the cyclone.

The process according to the invention has several advantages. It provides a simple method for the manufacture of particularly finely divided copper hydroxychloride by the known process of splitting off of water of hydration followed by rehydration of a relatively coarsely grained starting material, and in contrast to the usual spray driers and other heating devices such as rotary furnaces or drying drums it provides a remarkably high volume-time yield. Rehydration takes several hours. The quantity of water which is missing, as calculated from the analysis of the composition of the calcined product, may be mixed with the additives required if the final product is to be used as fungicide, such as dispersing agents and wetting agents, for example in a kneading machine or in a mixing worm, and the mixture may then be left to react in a silo to allow extensive conversion back into the hydroxy salt. The product may finally be ground, for example, in a pinned disc mill.

*Example 1*

20 kg. of salt-free washed copper hydroxychloride filter cake prepared by oxidation of CuCl in sodium chloride solution are adjusted to a water content of 55% and liquefied in a colloid mill (Kotthoff mixing mill) to form a thixotropic paste capable of being pulped. The fluid copper hydroxychloride paste is conveyed by means of a tube pump into an atomizing nozzle at the upper end of the heat-insulated, conical, heated reaction chamber, according to U.S. Patent 2,935,840, where it is dispersed into minute droplets in the axial direction into the conical reaction chamber by means of compressed air.

The hot gases are produced by burning 14 m.$^3$ (N.T.P.) per hour of illuminating gas having a calorific value of about 4000 Kcal./m.$^3$, in the combustion chamber preceding the atomizing chamber to which 200 m.$^3$ (at N.T.P.) per hour of air are added, and the hot gases are then introduced tangentially at a velocity of 70 m./sec. at the bottom, at the narrow end of the conical atomizing chamber.

The short time, amounting to about 0.1 sec., during which the droplets remain in the turbulent stream of hot gas is sufficient to remove water from the finely divided copper hydroxychloride before it reaches the walls of the atomizing chamber. The dry, finely divided copper hydroxychloride particles from which water of hydration has been partly removed leave the atomizing chamber tangentially at the top end, together with the steam and the combustion gases which are at a temperature of about 350 to 400° C., and are separated out in the cyclone following this chamber, and collected in a container disposed below it. The rate of drying in the apparatus, the atomizing chamber of which has a volume of about 30 litres, is about 90 kg. of copper hydroxychloride filter cake per hour when the hot gases enter at about 700° C. and leave at about 350° C. This corresponds to an output of 50 kg. of $H_2O/h$. or to a specific atomizer volume load of 1650 kg. of $H_2O/h.m.^3$.

The finely divided greyish brown product has a copper content of 64.9%. It is mixed with 10% of water and the mixture is left to stand overnight. After drying once more at 110° C., the product, which is now greyish green, contains 60.1% Cu, and is thus almost completely rehydrated (theoretical 59.5% Cu). The specific surface area of a product ground in a pinned disc mill is 8.1 m.$^2$/g. (by the BET method) and the bulk weight is 360 g./l. It is more finely divided and looser than the control sample obtained by the usual method of drying from the filter cake, which has a specific surface of 3.7 m.²/g. and a loose weight of 590 g./l. The process is technically particularly advantageous because drying and removal of water of hydration can be carried out in a single working step the apparatus operating at very high efficiency.

*Example 2*

The good fungicidal activity of the copper hydroxy chloride preparations prepared according to the invention as well as their good resistance to rain, which is superior to that of the commercial products, follows from a comparative showing which was carried out with young potted tomato plants of Bonny Best having 5 to 6 leaves. The preparation obtained as described in Example 1 as well as a commercial product, which were used in the comparative showing, contained each 50% Cu. The preparations were sprayed onto the plants at concentrations of 0.15% and 0.075% in an amount of 1000 l./hectare so that an amount of 1.5 and 0.75 kg. resp. was applied per hectare. 24 hours after spraying the dried plants were placed in an inoculation box at random distribution and sprayed with a zoospore suspension of the fungus *Phytophthora infestans*. The inoculated plants were kept in the inoculation box for 6 days at 100% relative humidity and a temperature of 18–20° C. and then evaluated. The degrees of infestation of each leaflet were indicated with numbers from 0 (=healthy) to 5 (=destroyed leaflet). The intensity of infestation was calculated from the number of the leaflets which were infested to varying degrees and indicated in percentages of the degree of infestation of the non-treated control plants whose infestation was regarded as 100. The control plants which were subjected to the same conditions were completely destroyed by the fungus. The resistance to rain was ascertained by watering the plants placed on a revolving platform, with distilled water (12.5 mm.) through two spray nozzles. The table below shows the results of the comparative showing.

TABLE.—*PHYTOPHTHORA INFESTANS*/TOMATO PLANTS
[Degree of infestation after spraying with the substances indicated]

|  | 1.5 kg./hectare | | 0.75 kg./hectare | |
|---|---|---|---|---|
|  | Non-watered | Watered | Non-watered | Watered |
| Product obtained according to Example 1 | 15 | 24 | 31 | 32 |

|  | 3.0 kg./hectare | | 1.5 kg./hectare | |
|---|---|---|---|---|
| Commercial copper hydroxy chloride preparation (containing 50% Cu) | 26 | 45 | 31 | 53 |
| Non-treated tomato plants | 100 | 100 | 100 | 100 |

We claim:
1. In a process for the production of finely divided particle form, copper hydroxy chloride suitable for use as a plant-protecting agent by calcining coarse copper hydroxy chloride ($3CuO \cdot CuCl_2 \cdot 3H_2O$) and thereafter hydrating the calcined copper hydroxy chloride, the improvement which comprises introducing aqueous copper hydroxy chloride ($3CuO \cdot CuCl_2 \cdot 3H_2O$) paste into a stream of hot inert gas maintained under turbulent flow conditions whereby particles of said paste are formed and dispersed in said gas stream, the dispersed paste particles being heated within a period of less than one second to 250–500° C. and the water of hydration incompletely split off, and hydrating the dehydrated product by contact with sufficient water to regenerate $3CuO \cdot CuCl_2 \cdot 3H_2O$ characterized by increased surface area and reduced bulk weight with respect to the starting copper hydroxy chloride material.

2. Improvement according to claim 1, which comprises effecting the heating of said particles to a temperature of between about 300 and 400° C.

3. Improvement according to claim 1, which comprises effecting the heating of said particles within a period of less than 0.1 second.

4. Improvement according to claim 1, wherein said gas stream has a temperature of between about 300–1,000° C.

References Cited by the Examiner

UNITED STATES PATENTS

| 2,104,754 | 1/1938 | Marsh et al. | 23—55 |
| 2,201,928 | 5/1940 | Souviron | 23—97 X |
| 2,241,800 | 5/1941 | Wolff | 23—97 |
| 2,337,466 | 12/1943 | Herbert | 167—16 |
| 2,356,299 | 8/1944 | Bernat | 167—16 |
| 2,935,840 | 5/1960 | Schoppe | 48—180 X |
| 3,030,178 | 4/1962 | Niemann et al. | 23—97 |

FOREIGN PATENTS

| 480,697 | 2/1938 | Great Britain. |
| 848,383 | 9/1960 | Great Britain. |

MAURICE A. BRINDISI, *Primary Examiner*.

GEORGE D. MITCHELL, JULIAN S. LEVITT,
*Examiners.*